W. E. WILLIAMS.
DEMOUNTABLE DISK WHEEL.
APPLICATION FILED JUNE 7, 1920.
1,410,046.
Patented Mar. 21, 1922.
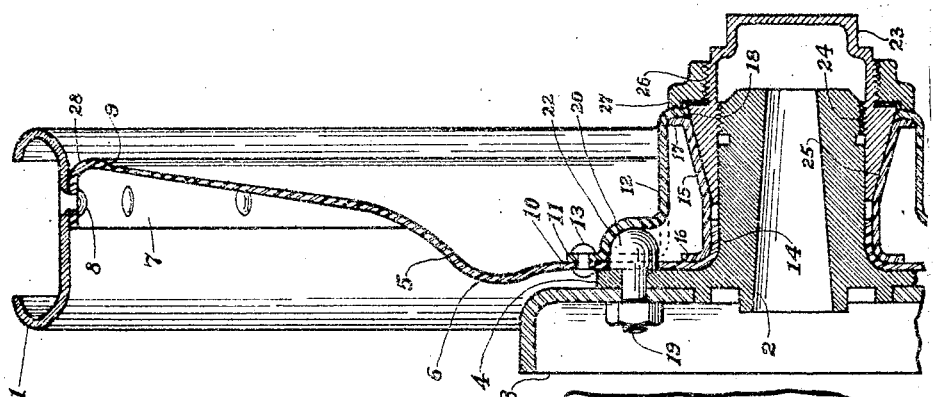
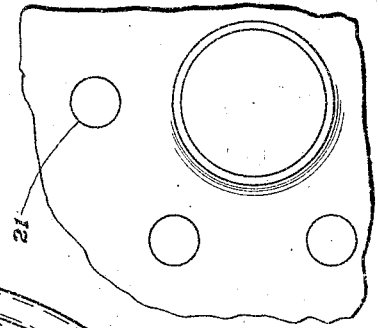
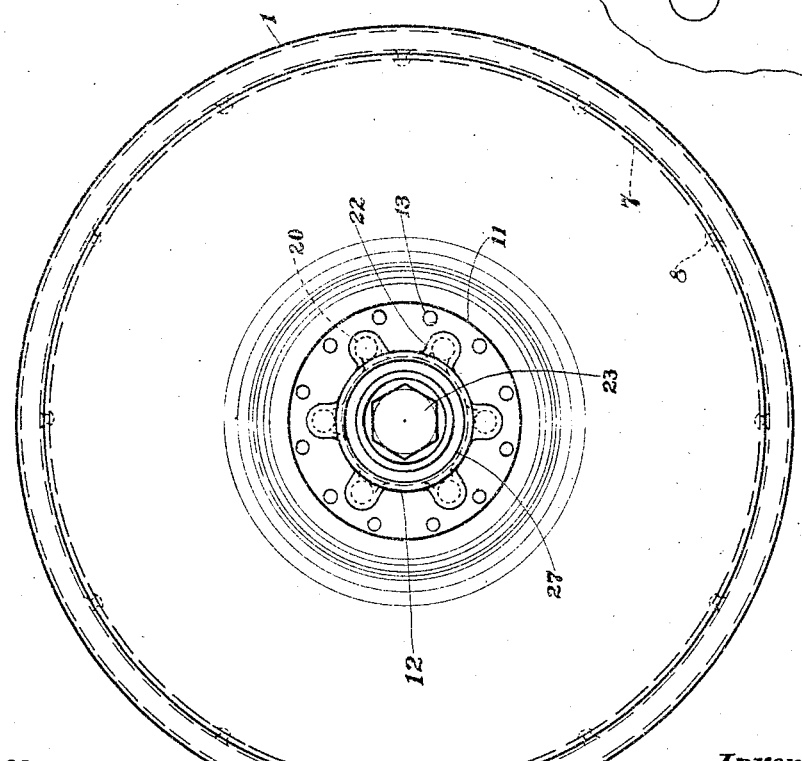
Witness:
B. J. Bernhard
Inventor
W. E. Williams

UNITED STATES PATENT OFFICE.

WILLIAM ERASTUS WILLIAMS, OF CHICAGO, ILLINOIS.

DEMOUNTABLE DISK WHEEL.

1,410,046. Specification of Letters Patent. Patented Mar. 21, 1922.

Application filed June 7, 1920. Serial No. 387,170.

*To all whom it may concern:*

Be it known that I, WILLIAM ERASTUS WILLIAMS, a citizen of the United States, a resident of Chicago, in the county of Cook and State of Illinois, have invented a new and useful Improvement in Demountable Disk Wheels, of which the following is a specification.

My invention relates to disk wheels for automobiles wherein the wheel is removable directly from the hub.

The object of the invention is to provide a desirable wheel of this type that may be mounted on the hub of a wood wheel such as is commonly used on automobiles.

Figure 1 is a front elevation of my wheel assembly.

Figure 2 is a transverse sectional view on a larger scale than that of Figure 1.

Figure 3 is a front elevation of a portion of the central zone of the disk.

In the drawing 1 indicates a clincher rim of an automobile wheel. 2 indicates the ordinary rear hub found with the ordinary wooden wheel of a common type of car. 3 indicates the brake drum, and 4 the flange which is a part of the hub 2. 5 indicates the disk of my wheel here shown in a peculiar shape having a dished saucer like concave surface on the outer side and a convex surface on the inside with a bulge or curve near the hub zone and indicated by 6. This disk 5 is turned over at its margin into a horizontal tread flange 7 connected by rivets 8 to the rim 1.

The disk is made quite thin at the point 9 near but distinctly within the line of the beginning of the flange 7, and gradually becomes thicker as it approaches the hub, the taper feature, however, terminating at 10, the point where the disk is joined to a reinforcing ring or flange 11 of a sleeve or tubular portion 12. This portion 12 is secured by rivets 13 to the main disk around the hub zone. In place of the rivets I may spot weld or otherwise suitably join the parts. The main body of the disk extends down and is turned over in a flange 14 resting on the barrel of the hub.

A secondary tubular sleeve hub member 15 has flanges 16, 17 turned on its inner and front edges, respectively, the flange 17 being enclosed by the member 12 and abutting a flange 18 thereof.

A series of bolts 19 having rounded heads 20 are used to fasten the hub flange 4 to the brake drum and the heads 20 of these bolts serve as locking members for registering the disk wheel on the hub 2, the disk, by means of holes 19 fitting over the heads 20 and preventing relative rotation of the hub and disk, and the registration is further aided by embossing the member 12 to fit over said heads 20.

A special hub nut indicated by 23 is provided with a suitable thread adapted to screw on to the thread 24 of the hub 2. This nut 23 is provided with a conical bearing surface 25 which bears against the flange 18 and the inner member 15 and thus makes a secure registration to hold the wheel on when the nut 23 is properly screwed home.

On the outer end of the outer margin of the nut 23 there is a thread 26 on which there is secured a lock washer 27 in the ordinary manner of locking nuts by a jam nut.

In all hubs for wooden wheels for automobiles there are provided threads on the outer end of the hub for the ornamental hub cap and I use these threads, rechasing them to a larger size into the threads which correspond to the threads 24 indicated in the drawing.

Thus with my construction I may remove the front flange and the wooden wheel from the body 2 and replace the ordinary bolts employed and substitute my bolts 19 and the hub is thus ready to receive my demountable disk wheel.

The disk being fitted over the boltholes 20 as above described, screwing home the hub nut 23 causes the conical face 25 to hold the wheel securely and yet in such a manner that it may be readily removed like demountable wire wheels.

By tapering the disk outwardly its weight is lessened while strength is preserved where it is important, and by thickening the metal for the flange and where it is bent in forming the flange, extra strength is secured to compensate weakening molecular changes at the bending region 28, and further, thick metal receives the rivets 8 which may therefore be less numerous.

What I claim is:—

1. The combination with a hub having an integral circumferential flange with a series of lateral projections on one face, of a rim-carrying disk perforated to fit over said projections and rest against said face, a tubular hub member fixed to the disk at some distance from the hub body, embossed to fit over said projections and having a hub supported flange at a distance from the plane of the disk, a second tubular hub member located within the first and having its ends abutting the disk and the last mentioned flange, respectively, and a nut arranged to engage the body of the hub and demountably clamp the disk and tubular member upon said body.

2. The combination with a hub body having a circumferential flange with a series of bolt heads projecting from one of its lateral faces, of a disk perforated to pass over said heads, a hub sleeve member embossed to cover and hold in place said heads and having an outwardly extending flange fixed to the disk and at its opposite end an inwardly turned flange supported from said body, a second hub sleeve member within the first and having its ends abutting the disk and inwardly turned flange, respectively, and a nut engaging the hub body and clamping the rest of the structure thereto.

3. The combination with a wheel disk and a hub sleeve having one end encircling the central opening and rigidly fixed to the disk at some distance from said opening, of a hub body having a flange provided with a series of rigid lateral projections fitting seats in both said disk and said sleeve, and means for clamping the disk and sleeve against the projection-bearing side of the flange.

4. In a wheel of the class described, a hub having a barrel and a flange of the type used in an artillery wheel, with a series of bolts passing through the flange and having rounded heads thereon, the latter being adapted to serve as registering projections for sustaining against rotation a demountable wheel; in combination with a disk demountable wheel having its web reinforced at the hub zone by an outer hub sleeve and an inner hub sleeve, the latter acting as a strut in the hub barrel region between the disk and the front end of the outer sleeve.

5. In a disk wheel adapted to have other parts removed leaving the hub body on the axle, the combination with a disk, of a concentric outer tubular member having one end rigidly secured to the disk, and a concentric inner tubular member, the disk and the two tubular members forming at the center of the disk a unitary structure adapted to slip over a hub body, and means for clamping said structure to such body.

6. In a wheel of the class described, a disk forming the web of the wheel and the disk reinforced in its hub zone by an outer hub sleeve secured at one end of the sleeve to the disk and adapted to register at the other end on a nut secured on the end of the hub.

7. In a wheel of the class described, a disk dished saucer shape and forming the web of the wheel and a hub thinner in the zone around the rim and tapering thicker toward the center and provided with a reinforcing sleeve secured to the disk in the hub zone and extending forward and furnishing the abutment surface for the nut screwed on to the end of the normal hub of a wheel; in combination with a normal hub having fastenings adapted to engage the hub region of the disk and its reinforcing flange; in combination with a nut adapted to be fixed to the normal hub and abut against the sleeve hub of the disk.

8. The combination with a hub body having a flange provided on one face with a series of projections, of a disk perforated to receive said projections and allow them to project from the disk, and a sleeve embossed to fit the outer ends of said projections, having one end fixed to the disk near the projections and the opposite end rigidly and detachably connected with said body.

Signed at Chicago, in the county of Cook and State of Illinois, this third day of June, 1920.

WILLIAM ERASTUS WILLIAMS.

Witnesses:
B. J. BERNHARD,
A. J. CARTER.